United States Patent [19]

Spencer

[11] Patent Number: 5,256,229
[45] Date of Patent: Oct. 26, 1993

[54] STERILE CONTAINMENT WELDING DEVICE FOR PLASTIC TUBES

[75] Inventor: Dudley W. C. Spencer, Wilmington, Del.

[73] Assignee: Denco, Inc., Wilmington, Del.

[21] Appl. No.: 29,704

[22] Filed: Mar. 11, 1993

Related U.S. Application Data

[63] Continuation-in-part of Ser. No. 965,875, Oct. 23, 1992.

[51] Int. Cl.[5] .................. B29C 57/10; B29C 65/20
[52] U.S. Cl. .................................. 156/158; 156/251;
156/258; 156/304.2; 156/304.5; 156/304.6;
156/515; 156/518; 156/530
[58] Field of Search .................. 156/158, 304.2, 304.5,
156/304.6, 251, 258, 515, 518, 530

[56] References Cited

U.S. PATENT DOCUMENTS

| | | | |
|---|---|---|---|
| 3,853,655 | 12/1974 | Pecha | 156/304.2 |
| 4,352,708 | 10/1982 | McElroy | 156/158 |
| 4,521,263 | 6/1985 | Benin et al. | 156/304.2 |
| 4,957,570 | 9/1990 | Jenkins et al. | 156/304.2 |
| 5,141,592 | 8/1992 | Shaposka et al. | 156/158 |
| 5,158,630 | 10/1992 | Shaposka et al. | 156/158 |
| 5,209,800 | 5/1993 | Spencer et al. | 156/158 |

Primary Examiner—Caleb Weston
Attorney, Agent, or Firm—Connolly & Hutz

[57] ABSTRACT

A sterile containment welding device for plastic tubes comprises a pair of side by side spaced tube holders. Each of the tube holders includes a clamp base and a clamp lid. A pocket is provided in each clamp base extending completely across the clamp base so that a plastic tube could be inserted into the pocket and clamped in the holder when its clamp lid is moved to a closed position. Pockets of the side by side tube holders are alignable with each other to permit a plastic tube in one of the holders to be welded to the plastic tube in the other of the holders. A tube locating member is movably mounted at the end of each pocket in the space between the holders. The tube locating member has a wall disposed in the space beyond the pocket for positioning its plastic tube in the proper position for the later welding step when its tube is moved into contact with the walls. An inactivating member is mounted to each clamp lid to contact the tube locating member and move it out of contact with its plastic tube upon the closing of the lid so that the tubes are exposed to be heated and welded together.

18 Claims, 3 Drawing Sheets

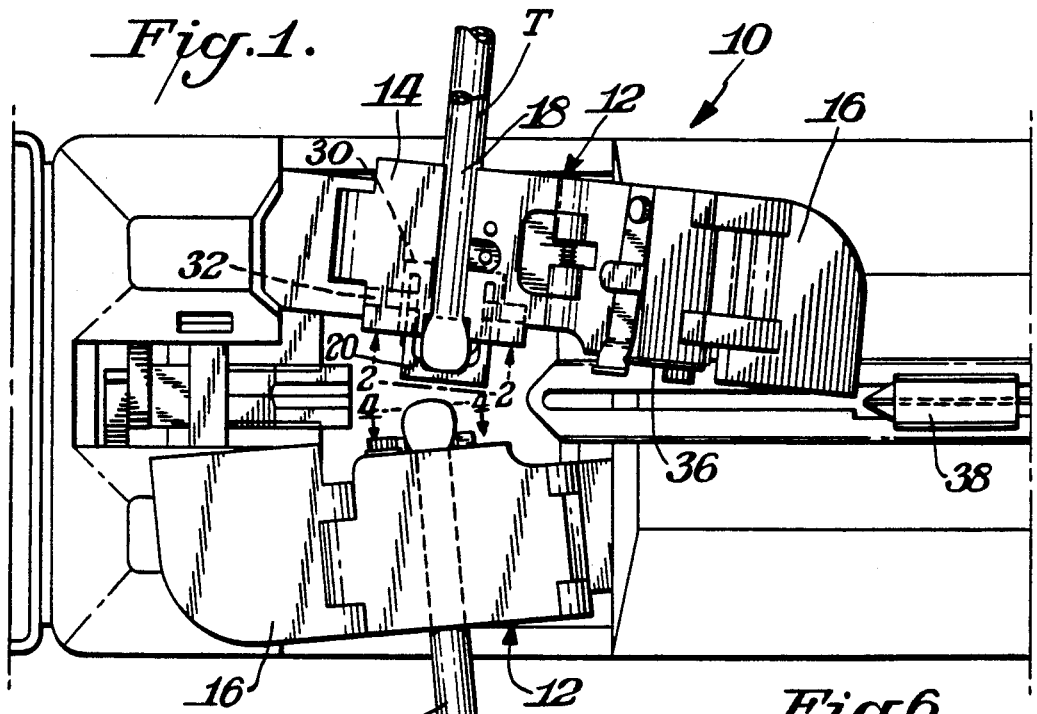
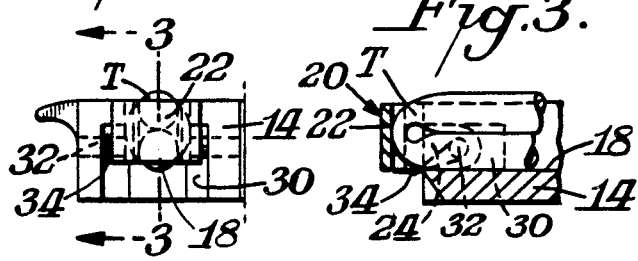
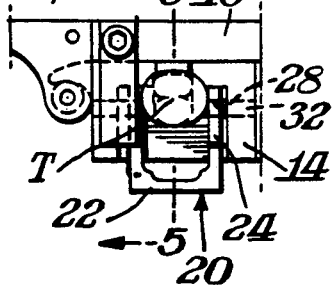
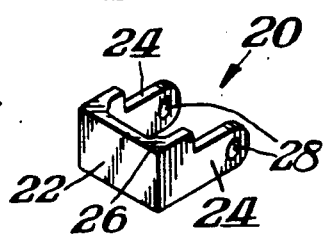
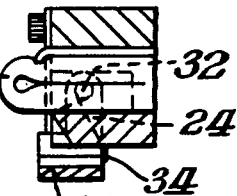
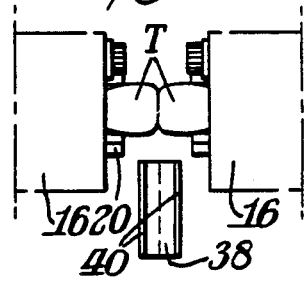
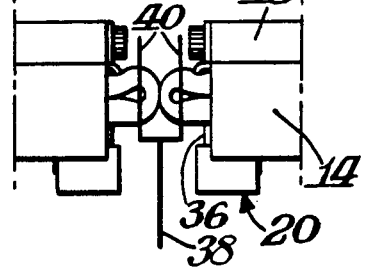

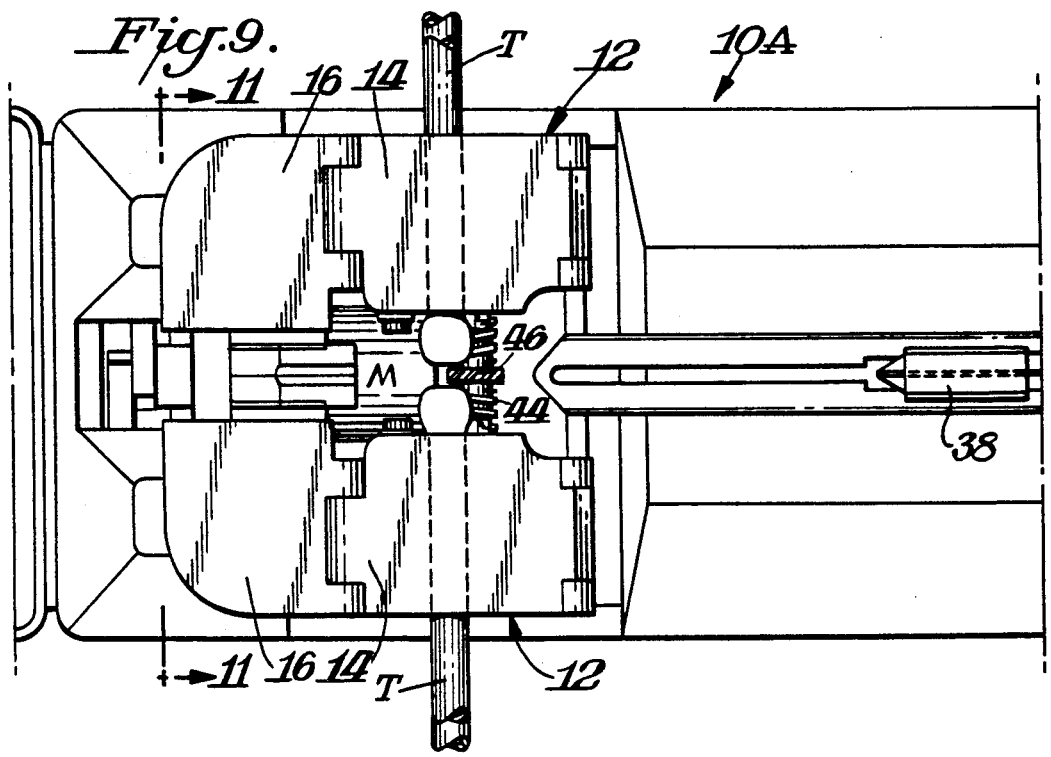
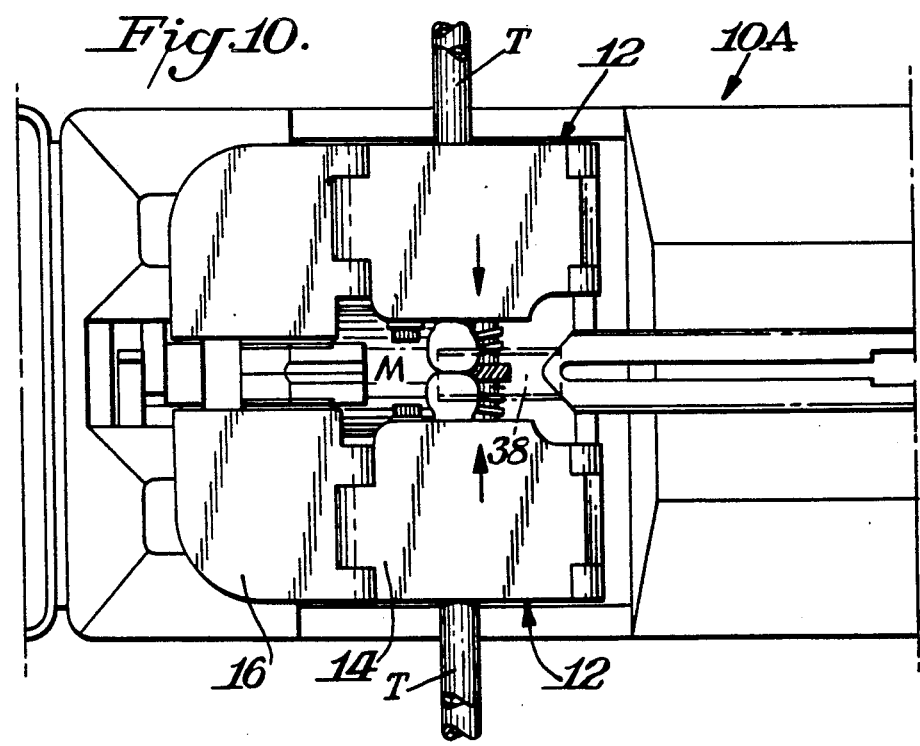

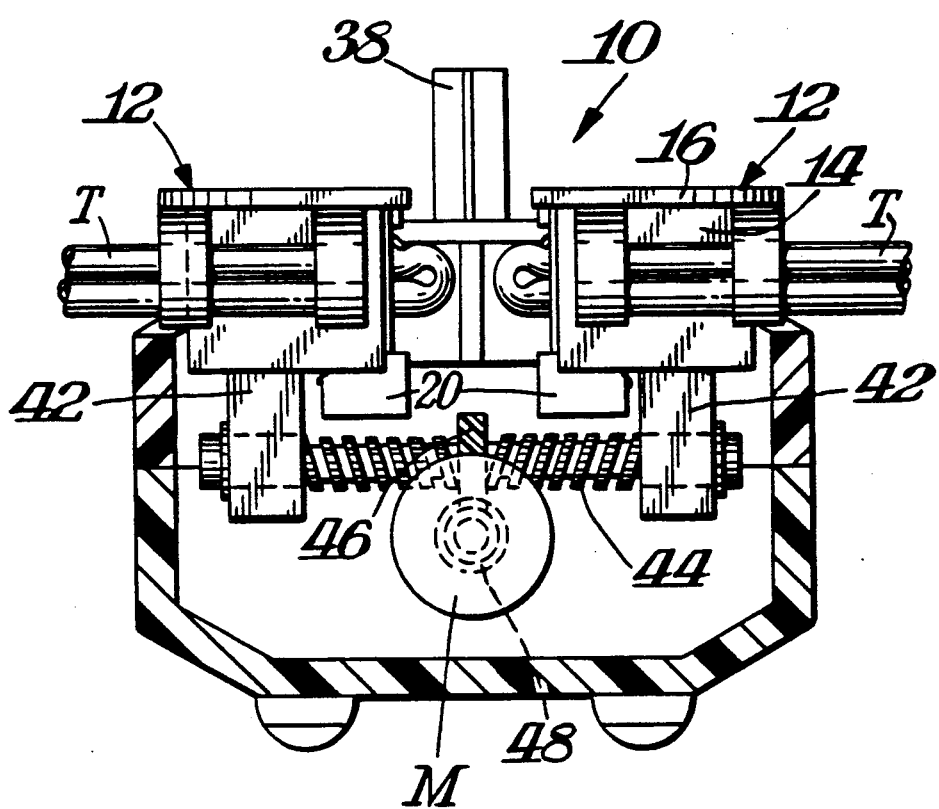

STERILE CONTAINMENT WELDING DEVICE FOR PLASTIC TUBES

CROSS-REFERENCE TO RELATED APPLICATION

This application is a continuation in part of application Ser. No. 965,875 filed Oct. 23, 1992.

BACKGROUND OF THE INVENTION

Various types of devices exist for the welding of plastic tubes. Generally, these devices take the form of side by side spaced tube holders having pockets or grooves into which a pair of tubes would be mounted. The ends of the tubes are heated to create a molten condition of the plastic material and then the heated ends are pressed together to weld the tubes into a unitary structure.

In order to insure that a proper welding results it is necessary that the tubes be precisely located for the heating and welding operations. U.S. Pat. No. 4,753,697 discloses an arrangement in FIG. 3 wherein an aligning bar 24 is suspended from a rail 26 so that the aligning bar could be located in the space between the tube holders and so that the tubes could be moved forward into contact with the aligning bar. Thus, the aligning bar would form a means of locating the tubes with respect to each other. After this locating step is performed, the aligning bar is moved out of its position of contact with the tubes.

Parent application Ser. No. 965,875 discloses a total containment device for the connect/disconnect of plastic tubes. That device includes movable wall mounted to each clamp base. The wall serves as a locator for properly positioning a tube in its associated clamp base. Each base includes a clamp lid which has an inactivating member so that upon movement of the lid to its closing position the wall is automatically moved out of contact with its tube to expose the tubes for the later heating and welding steps. This arrangement has the advantage of automatically removing the movable wall away from the tubes upon the closing of the lid and does not rely upon other operations, such as would be required to move the aligning bar out of contact with the tubes as in U.S. Pat. No. 4,753,697. The present invention is directed to these aspects of parent application Ser. No. 965,875.

SUMMARY OF THE INVENTION

An object of this invention is to provide a sterile containment welding device which includes some means for properly positioning the plastic tubes for the later heating and welding steps.

A further object of this invention is to provide such a device which utilizes features disclosed in parent application Ser. No. 965,875 for automatically removing the locating member after the tubes have been properly positioned.

A still further object of this invention is t provide such a device which can be used for properly positioning fluid filled tubes, particularly tubes mounted in a bent condition.

In accordance with this invention a sterile containment welding device for plastic tubes comprises a pair of side by side spaced tube holders. Each of the tube holders includes a clamp base and a clamp lid with a pocket extending completely across the clamp base so that a plastic tube may be inserted in the pocket and clamped in the holder when the clamp lid is moved to its closed position. The pockets of the side by side tube holders are alignable with each other to permit a plastic tube in one of the holders to be welded to a plastic tube in the other holder after the tubes have been heated. In accordance with the invention a tube locating member is mounted at the end of each pocket in the space between the holders. Each tube locating member has a wall located in the space between the holders with the wall disposed beyond and across its pocket for positioning a plastic tube in its proper location during the later welding step. This is accomplished by moving the tube into contact with the wall. An inactivating member is mounted to its lid and is movable into contact with its tube locating member for moving the tube locating member out of contact with the plastic tube upon the closing of the lid to expose the tubes and permit them to be later heated and welded together.

The invention may be practiced by utilizing a spring to bias the tube locating member in its positioning orientation. The tube locating member may be U-shaped with the bight of the U being the locating wall and with the legs of the U having holes into which pivot pins are inserted to permit the tube locating member to be pivoted out of contact with the tube upon the closing of the lid.

THE DRAWINGS

FIG. 1 is a plan view of a sterile total containment welding device in accordance with this invention;

FIG. 2 is a view taken through FIG. 1 looking in the direction of line 2—2;

FIG. 3 is a cross-sectional view taken through FIG. 2 along the line 3—3;

FIG. 4 is a view taken through FIG. 1 looking in the direction of the line 4—4;

FIG. 5 is a cross-sectional view taken through FIG. 4 along the line 5—5;

FIG. 6 is a top plan view showing the device of FIGS. 1-5 with a heated wafer;

FIG. 7 is a side elevational view of the device shown in FIG. 6;

FIG. 8 is a perspective view of the tube locating member shown in FIGS. 1-5;

FIG. 9 is a plan view of a modified welding device in accordance with this invention showing the tubes spaced apart;

FIG. 10 is a view similar to FIG. 9 showing a wafer cutting through the tubes; and FIG. 11 is a cross-sectional view taken through FIG. along the line 11—11.

DETAILED DESCRIPTION

FIG. 1 illustrates a sterile containment welding device 10 in accordance with this invention. Device 10 is generally of the structure of the device illustrated and described in parent application Ser. No. 965,875 the details of which are incorporated herein by reference thereto. Accordingly, device 10 will be described only with respect to those details as is necessary for an understanding of the present invention.

As shown in FIG. 1 device 10 includes a pair of side by side spaced tube holders 12,12. Each of the tube holders includes a clamp base 14 and a clamp lid 16 pivotally connected to the clamp base. A pocket or groove 18 extends completely across each clamp base so that a plastic tube T may be inserted in the pocket and clamped to its holder when clamp lid 16 is pivoted to its closed position. FIG. 1 illustrates one of the clamp holders with its lid 16 in the open position at the upper portion of FIG. 1 while the lower portion of FIG. 1 illustrates the clamp holder with the lid 16 in its closed clamping position. FIGS. 2-3 show the lid 16 open and FIGS. 4-5 show the lid closed.

As shown in FIG. 1 the clamp holders 12,12 are mounted spaced from each other. As described in the parent application, the clamp holders can be moved toward and away from each other to change the spacing. Initially, the spacing would be greater when the tubes T,T are inserted into each clamp holder. It is essential that the tubes be properly positioned in the clamp holders so that when the clamp holders are then pivoted toward each other the tubes are properly aligned and spaced for the later heating and welding operations. The present invention incorporates a tube locating member 20 mounted to each clamp base 14 at the end of each pocket 18 in the spacing between the tube holders.

FIG. 8 illustrates a tube locating member 20. As shown therein tube locating member 20 is generally U-shaped with the hight of the U being a flat wall 22 and with a pair of legs 24 extending outwardly from wall 22. The inner surface of tube locating member 20 has an inwardly directed shoulder 26 at the junction of each leg 24 with the bight or wall 22. This creates a recess at the inner surface of wall 22 which would be dimensioned to receive a tube T. The shoulders 26 would provide some clearance to accommodate the plastic tube T as it is pressed into the recess at the inner surface of locating wall 22. As also shown in FIG. 8, each leg 24 is provided with a hole 28 extending completely through the leg.

As shown in FIG. 1 the clamp base 14 includes a cutaway portion 30 which would accommodate tube locating member 20 when the tube locating member 20 is rotated from its tube locating position shown in the upper portion of FIG. 1 and in FIGS. 2-3 to its inactive position as shown in the lower portion of FIG. 1 and in FIGS. 4-5. The pivotal movement of tube locating member 20 is achieved by means of pins 32 mounted in clamp base 14 and extending into the holes 28 in legs 24 of tube locating member 20. Tube locating member 20 is biased upwardly to its tube locating position by any suitable means such as spring 34. Thus, in the position shown in the upper portion of FIG. 1, spring 34 would urge tube locating member 20 to a position where its end wall 22 would be disposed outwardly from, but across the pocket 18. A tube T would be inserted into pocket 18 and moved inwardly until the tube contacts the recess at the inner surface of tube locating wall 22. This assures the proper position of tube T.

After a tube T is moved into contact with wall 22, lid 16 would then be moved to its closed clamping condition. An inactivating member 36, such as a flange or other projection is mounted on the inner surface of lid 16 and is located so that when lid 16 is pivoted to its closed position inactivating member 36 contacts tube locating member 20 and the continued downward clamping movement of lid 16 urges tube locating member 20 to pivot downwardly in opposition to the force from spring 34 so that the tube locating member is pivoted out of contact with tube T and into a location where it would not interfere with the later heating and welding operations. FIGS. 4-5, for example, illustrate tube locating member 20 when pivoted to the inactive position.

Device 10 may be used for welding any type of plastic tubes together. Device 10, however, is particularly advantageous in the welding of fluid filled tubes. Device 10 overcomes serious limitations encountered by the prior art in attempting to properly locate such fluid filled tubes. Because of the varying amount of plastic involved in the end of the distal tube, device 10 and particularly tube locating member 20 avoid the excess material problem of a single tube and also eliminate the residual liquid problem by using the wall 22 to locate the ends of a tube, particularly a fluid filled bent tube, such as illustrated herein.

In operation, after each tube T is properly located in its clamp base 14 by means of tube locating member 20 each lid 16 would be closed to move its tube locating member 20 to its inactive position. The tube holders 12,12 would later be pivoted toward each other and the tube ends would make proper contact with each other as illustrated in FIGS. 6-7. After locating members 20 have been moved to their inactive position a heated wafer 38 would be moved into contact with the tubes. The heated wafer may take any suitable form. FIGS. 6-7 illustrate a wafer 38 having a pair of wings 40,40 and may generally of the type of structure shown and described in U.S. Pat. No. 5,158,630, the details of which are incorporated herein by reference thereto. It is to be understood, however, that any suitable structure may be used for wafer 38 including the various structures described in co-pending application Ser. No. 764,249, filed Sep. 23, 1991, the details of which are incorporated herein by reference thereto. The wafer may operate by cutting through the bent tubes as illustrated in FIG. 7 or may use a melt-wipe type of operation such as described in parent application Ser. No. 965,875 and the parent applications referred to therein.

After the wafer 38 has cut through the tube ends the clamp holders 12,12 are moved closer together and the cut tube sections resulting from the cutting operation are pressed into contact with each other to weld each tube section from one holder to a respective tube section of the other holder in a known manner.

The embodiment illustrated in FIG. 1 utilizes a pair of tube holders 12 which are pivotally mounted to be moved toward and away from each other. It is to be understood, however, that the invention may be practiced with other forms of tube holders. FIGS. 9-11, for example, illustrate a device 10A wherein each tube holder 12 is mounted for moving toward and away from each other along a straight line rather than being pivotally mounted for movement along an arc. Any suitable means may be used for moving the tube holders 12. FIG. 11 best illustrates one form of movement means. As shown therein each tube holder 12 is mounted to a bearing block 42. Each bearing block 42 has a hole extending completely therethrough with a reverse thread lead screw 44 threadably engaged in each hole. Lead screw 44 has a gear 46 centrally mounted thereon which is in engagement with a worm gear 48 driven by reversible motor M. Thus, the holders 12,12 may be moved toward and away from each other in accordance with the direction of movement of motor M.

FIG. 9 illustrates the position of the various components of device 10A when the tubes T,T are spaced apart from each other but the clamp lids 16,16 are closed to move locating member 20 to its inactive position which is shown in FIG. 11. As illustrated in this initial positioning wafer 38 is approaching the space between the aligned parallel tube holders 12,12.

FIG. 10 illustrates a further sequence in operation wherein activation of motor M causes the tube holders 12,12 to be moved toward each other so that the ends of the tubes touch. In this position wafer 38 is shown cutting through the tubes. After wafer 38 passes through the tubes motor M causes the tube holder 12,12 to be moved further closer together so that the heated tube ends contact and are welded together as previously described.

It is to be understood that the concepts of this invention may be practiced in various types of devices. FIG. 1, for example, illustrates a device wherein each tube holder includes a single groove or pocket for receiving a single tube. Other arrangements, however, may be used which would include, for example, multiple grooves or pockets wherein the tube holders are laterally shifted to realign pockets of one holder with pockets of another holder. Additionally, while the present invention is particularly advantageous with bent fluid filled tubes the invention may be practiced where there is no fluid in the tubes or where the tubes are placed in an unbent straight condition.

What is claimed is:

1. A sterile containment welding device for plastic tubes comprising a pair of side by side spaced tube holders, each of said tube holders including a clamp base and a clamp lid for selective clamping engagement with said clamp base, a pocket in said clamp base extending completely across clamp base for having a plastic tube inserted in said pocket and being clamped in said holder when said clamp lid is in a closed position, said pockets of said side by side tube holders being alignable with each other to permit a plastic tube in one of said holders to be welded to a plastic tube in the other of said holders, a tube locating member movably mounted at the end of each of said pockets in the space between said holders, said tube locating member having a wall disposed in said space beyond and across said pocket for positioning its plastic tube in the proper position for the later welding step when its tube is moved into contact with said wall, and an inactivating member mounted to a respective lid and movable into contact with each of said tube locating members for moving its said tube locating member out of contact with its plastic tube upon the closing of its lid to permit the tubes to be heated and welded together.

2. The device of claim 1 including biasing means for biasing each of said tube locating members to a tube contacting position.

3. The device of claim 2 including pivot means for permitting each of said tube locating members to be selectively pivoted to its tube contacting position and its inactive position.

4. The device of claim 3 wherein said tube locating member is U-shaped having a pair of legs joined by a bight, and said bight comprising said wall.

5. The device of claim 4 wherein said pivot means includes a pivot pin in each of said holes, and said biasing means comprising a spring mounted to said tube locating member.

6. The device of claim 5 wherein said U-shaped member has an inner surface and an inwardly directed shoulder at the junction of each of said legs with said bight to create a recess at said inner surface of said bight.

7. The device of claim 6 wherein said inactivating member is an abutment on the inner surface of said lid.

8. The device of Claim, 7 including a heated wafer for melting the ends of the tubes when said tube locating members are in their inactive position.

9. The device of claim 8 wherein said heated wafer includes a pair of wings.

10. The device of claim 9 in combination with a fluid filled tube in each of said pockets.

11. The combination of claim 10 wherein each of said tubes is bent upon itself.

12. The device of claim 1 wherein said heated wafer includes a pair of wings.

13. The device of claim 12 in combination with a fluid filled tube in each of said pockets.

14. The device of claim 1 Wherein said tube holders are pivotally mounted for movement along an arc toward and away from each other.

15. The device of claim 1 wherein said tube holders are mounted parallel to each other for linear movement toward and away from each other.

16. A method for the sterile containment welding of two plastic tubes comprising the steps of mounting each tube in the clamp base of a pair of side by side spaced tube holders wherein the tube is mounted in a pocket extending completely across the clamp base, pushing each tube in its pocket until the tube contacts the wall of the tube locating member disposed in the space between the side by side tube holders and with the wall being beyond and across its respective pocket, pushing the tube until the tube contacts the wall, closing a clamp lid of the tube holder against the clamp base, and moving the tube locating member out of contact with its tube upon the closing of the lid by means of an inactivating member on the lid pressing against the tube locating member.

17. The method of claim 16 including heating the ends of the tubes with a heated wafer after the tube locating members have been moved to their inactive position to melt the ends of the tubes, and pressing the melted ends of the tubes into contact with each other to weld the ends of the tubes together.

18. The method of claim 17 wherein the tubes are fluid filled and are inserted into the pockets by being bent upon themselves.

* * * * *